US010395542B2

(12) United States Patent
Yakan

(10) Patent No.: US 10,395,542 B2
(45) Date of Patent: Aug. 27, 2019

(54) DRONE TRAFFIC ENGINEERING

(71) Applicant: Cisco Technology, Inc., San Jose, CA (US)

(72) Inventor: Medhat Ramzi Yakan, Ontario (CA)

(73) Assignee: Cisco Technology, Inc., San Jose, CA (US)

( * ) Notice: Subject to any disclaimer, the term of this patent is extended or adjusted under 35 U.S.C. 154(b) by 55 days.

(21) Appl. No.: 15/083,271

(22) Filed: Mar. 28, 2016

(65) Prior Publication Data

US 2017/0278405 A1 Sep. 28, 2017

(51) Int. Cl.
*G08G 5/00* (2006.01)
*B64C 39/02* (2006.01)

(52) U.S. Cl.
CPC .......... *G08G 5/006* (2013.01); *B64C 39/024* (2013.01); *G08G 5/0013* (2013.01); *G08G 5/0026* (2013.01); *G08G 5/0034* (2013.01); *G08G 5/0039* (2013.01); *G08G 5/0043* (2013.01); *G08G 5/0069* (2013.01); *G08G 5/0082* (2013.01); *B64C 2201/021* (2013.01); *B64C 2201/141* (2013.01); *B64C 2201/143* (2013.01); *B64C 2201/146* (2013.01)

(58) Field of Classification Search
USPC ....................................................... 701/120
See application file for complete search history.

(56) References Cited

U.S. PATENT DOCUMENTS

| 3,644,883 | A  | * | 2/1972  | Borman   | G08G 1/127 340/991    |
|-----------|----|---|---------|----------|-----------------------|
| 5,684,859 | A  | * | 11/1997 | Chanroo  | H04M 11/022 340/7.21  |
| 6,055,413 | A  | * | 4/2000  | Morse    | H04L 12/1895 340/7.43 |
| 6,580,979 | B2 | * | 6/2003  | Payton   | G05D 1/0242 701/25    |
| 6,792,282 | B1 | * | 9/2004  | Domino   | H03G 3/3047 455/102   |
| 6,795,712 | B1 | * | 9/2004  | Vakilian | H03F 1/0211 370/335   |
| 7,113,746 | B2 | * | 9/2006  | Payton   | H04L 41/046 455/132   |
| 7,893,758 | B2 | * | 2/2011  | Parsa    | H04L 27/364 329/358   |
| 8,558,552 | B2 | * | 10/2013 | Chappell | H04B 3/46 324/534     |
| 9,087,451 | B1 | * | 7/2015  | Jarrell  | G08G 5/0069           |
| 9,274,521 | B1 | * | 3/2016  | Stefani  | G08G 5/0026           |

(Continued)

*Primary Examiner* — Jean Paul Cass
(74) *Attorney, Agent, or Firm* — Behmke Innovation Group LLC; James Behmke; Stephen D. LeBarron

(57) ABSTRACT

In one embodiment, a method includes receiving a request for a flight path for a drone, the request including information indicative of a source location within a geographical area and a destination location within the geographical area, modeling the geographical area including a plurality of geographical regions as a data network including a plurality of nodes, determining a network data path from a source node of the plurality of nodes corresponding to the source location to a destination node of the plurality of nodes corresponding to the destination location, determining a flight path for the drone based on the network data path, and transmitting data indicative of the flight path for the drone.

20 Claims, 7 Drawing Sheets

(56) References Cited

U.S. PATENT DOCUMENTS

| | | | | |
|---|---|---|---|---|
| 9,620,024 B1* | 4/2017 | Mottram | | G01S 5/0027 |
| 9,621,203 B2* | 4/2017 | Rada | | G01M 3/00 |
| 9,645,229 B2* | 5/2017 | Jales | | G01S 7/062 |
| 9,671,791 B1* | 6/2017 | Paczan | | B64C 39/024 |
| 9,684,807 B2* | 6/2017 | Brown | | H03D 3/00 |
| 9,685,087 B2* | 6/2017 | Berckefeldt | | G08G 5/0078 |
| 9,686,124 B2* | 6/2017 | Ameixiera | | H04W 56/0025 |
| 9,699,768 B2* | 7/2017 | Werb | | H04W 4/70 |
| 9,705,736 B2* | 7/2017 | Wang | | H04L 41/08 |
| 9,729,197 B2* | 8/2017 | Gross | | H04B 3/52 |
| 9,818,303 B2* | 11/2017 | Kotecha | | G08G 5/0034 |
| 2002/0135442 A1* | 9/2002 | Sawada | | H03H 9/0071 |
| | | | | 333/195 |
| 2002/0167378 A1* | 11/2002 | Sawada | | H03H 9/0071 |
| | | | | 333/193 |
| 2002/0177425 A1* | 11/2002 | Li | | H03D 7/18 |
| | | | | 455/296 |
| 2003/0096586 A1* | 5/2003 | Oates | | G01S 7/021 |
| | | | | 455/226.1 |
| 2004/0012517 A1* | 1/2004 | Abou-Jaoude | | G01S 7/4052 |
| | | | | 342/165 |
| 2004/0066254 A1* | 4/2004 | Shibahara | | H03H 9/0038 |
| | | | | 333/195 |
| 2004/0077325 A1* | 4/2004 | Takamine | | H03H 9/0071 |
| | | | | 455/286 |
| 2004/0083409 A1* | 4/2004 | Rozenblit | | H03F 1/0211 |
| | | | | 714/48 |
| 2004/0198301 A1* | 10/2004 | Rozenblit | | H03G 3/004 |
| | | | | 455/343.1 |
| 2005/0076054 A1* | 4/2005 | Moon | | G05D 1/0088 |
| 2006/0072505 A1* | 4/2006 | Carrillo | | H04L 41/042 |
| | | | | 370/331 |
| 2007/0088560 A1* | 4/2007 | Mock | | H04M 1/72555 |
| | | | | 340/539.13 |
| 2007/0132889 A1* | 6/2007 | Pan | | H03D 7/145 |
| | | | | 348/726 |
| 2007/0140195 A1* | 6/2007 | Kaftan | | H04L 29/1233 |
| | | | | 370/338 |
| 2007/0168117 A1* | 7/2007 | Howard | | F41G 3/04 |
| | | | | 701/425 |
| 2007/0242158 A1* | 10/2007 | Pugel | | H04B 1/28 |
| | | | | 348/554 |
| 2007/0298838 A1* | 12/2007 | Meiyappan | | H04B 1/0057 |
| | | | | 455/553.1 |
| 2008/0107093 A1* | 5/2008 | Meiyappan | | H04B 1/1036 |
| | | | | 370/339 |
| 2008/0155376 A1* | 6/2008 | Williams | | H04L 1/0045 |
| | | | | 714/760 |
| 2009/0043729 A1* | 2/2009 | Liu | | G06F 16/2454 |
| 2009/0077608 A1* | 3/2009 | Romerein | | H03H 7/463 |
| | | | | 725/127 |
| 2009/0141183 A1* | 6/2009 | Ecoff | | H03F 1/26 |
| | | | | 348/731 |
| 2009/0181722 A1* | 7/2009 | Stensson | | H01Q 1/246 |
| | | | | 455/562.1 |
| 2009/0231169 A1* | 9/2009 | Mittal | | H03M 7/3082 |
| | | | | 341/51 |
| 2009/0285135 A1* | 11/2009 | Rousu | | H04B 1/0057 |
| | | | | 370/297 |
| 2009/0286478 A1* | 11/2009 | Biber | | G01R 33/3607 |
| | | | | 455/41.2 |
| 2009/0322563 A1* | 12/2009 | Stadtmiller | | G08G 1/081 |
| | | | | 340/909 |
| 2010/0004801 A1* | 1/2010 | Flotte | | G05D 1/0646 |
| | | | | 701/8 |
| 2013/0293406 A1* | 11/2013 | Herman | | F41H 3/00 |
| | | | | 342/20 |
| 2013/0297096 A1* | 11/2013 | Herman | | F41H 3/00 |
| | | | | 701/1 |
| 2013/0297271 A1* | 11/2013 | Herman | | G06Q 10/10 |
| | | | | 703/8 |
| 2015/0236778 A1* | 8/2015 | Jalali | | H04W 84/06 |
| | | | | 370/316 |
| 2015/0263886 A1* | 9/2015 | Wang | | H04L 41/08 |
| | | | | 370/254 |
| 2016/0240087 A1* | 8/2016 | Kube | | G08G 5/006 |
| 2017/0069214 A1* | 3/2017 | Dupray | | G08G 5/0021 |
| 2017/0162059 A1* | 6/2017 | Jarrell | | G08G 5/0069 |
| 2017/0193377 A1* | 7/2017 | Fertig | | G06N 5/047 |
| 2017/0193378 A1* | 7/2017 | Fertig | | G06N 5/047 |
| 2018/0018883 A1* | 1/2018 | Kotecha | | G08G 5/0034 |

* cited by examiner

DRONE TRAFFIC ENGINEERING

TECHNICAL FIELD

The present disclosure relates generally to drone traffic engineering, and in particular, to systems, methods and apparatuses enabling generation of flight paths for a large number of drones.

BACKGROUND

The ongoing development, maintenance, and expansion of air traffic control systems involve an increasing number of unmanned aerial vehicles, autonomous aerial vehicles, and drones (collectively referred to as drones). This can present a challenge in managing the number of drones in the airspace. Replicating the existing model of air traffic control used in commercial aviation may not be scalable given the expected number of drones which will likely exceed the capacity of any current air traffic control systems.

Further, despite the fact that autonomous drone navigation is currently possible, there is no solution preventing over congestion of certain areas. When the number of drones in a certain section of the airspace increases, the chances of collisions and accidents increase even if the drones have ways to detect and avoid collisions.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
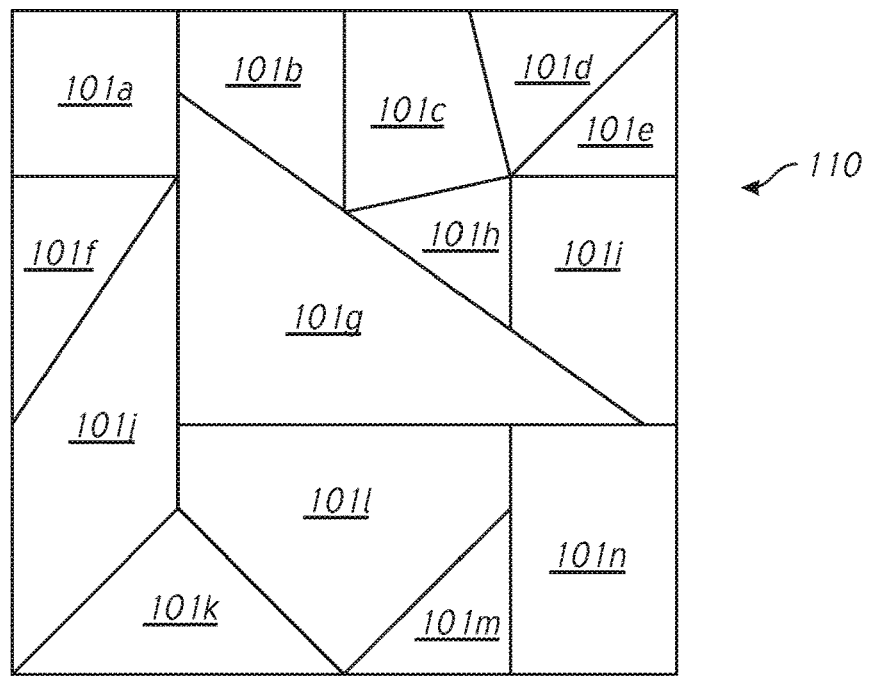
FIG. 1A is a diagram of geographical area in accordance with some implementations.

In accordance with common practice various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Various implementations disclosed herein include apparatuses, systems, and methods for generating, transmitting, receiving, and executing flight paths for drones. For example, in some implementations, a method includes receiving a request for a flight path for a drone, the request including information indicative of a source location within a geographical area and a destination location within the geographical area, modeling the geographical area including a plurality of geographical regions as a data network including a plurality of nodes, determining a network data path from a source node of the plurality of nodes corresponding to the source location to a destination node of the plurality of nodes corresponding to the destination location, determining a flight path for the drone based on the network data path, and transmitting data indicative of the flight path for the drone.

In other implementations, a method includes receiving an instruction to traverse a boundary between a first geographical region and a second geographical region, transmitting a request to traverse the boundary upon approaching the boundary, and receiving permission to traverse the boundary.

Example Embodiments

Drones are becoming more and more popular and prevalent and this trend is expected to continue. This presents a challenge in managing the number of drones in the airspace. Conventional air traffic control used in commercial aviation may not be scalable as the expected number of drones will likely exceed the capacity of any current air traffic control system.

According, described herein is a scalable solution to managing a large number of drones by which the problem of routing aircraft is mapped to the well-known, well-researched, and relatively mature networking domain. Many of the existing protocols and methods used in network traffic engineering systems can be leveraged to provide air traffic control instructions to drones as they traverse legislated airspace. These solutions scale better than existing commercial air traffic control solutions or source-based solution where the drone or its operator submits a flight plan which then has to be validated and approved.

One advantage of this approach is that it provides a more predictable way to ensure drone traffic congestion does not become a problem. Human involvement can be minimal by just requiring traffic engineers to enter the system parameters and then having the system itself compute, maintain, and manage the traffic. It also provides proven scalability and reliability since it is based on networking protocols used in networking gear that manage billions of packets per second.

FIG. 1A is a diagram of geographical area 110 in accordance with some implementations. The geographical area 110 is partitioned into a number of geographical regions 101a-101n. Each of the geographical regions 101a-101n borders one or more other geographical regions 101a-101n. In order to navigate a drone from a source location within a source region to a destination location within a destination region, a flight path is generated between the two locations passing through a number of the geographical regions 101a-101n.

In some implementations, the flight path is generated in order to minimize a cost metric (e.g., distance travelled). Thus, in some implementations, the flight path is a substantially straight line between the source location and the destination location. However, as the number of drones operating in the geographical area 110 increases, such a flight path may be unobtainable for all of the drones without increasing the risk of collision or delay in avoiding traffic.

Generating safe flight paths for each of a large number of drones can be difficult. However, by analogizing the geographical area 110 to a computer network and analogizing drones operating in the geographical area 110 to data packets traversing the network, flight paths for the drones can be determined using network protocols for routing data packets from a source node to a destination node within the network.

Figure 1B:
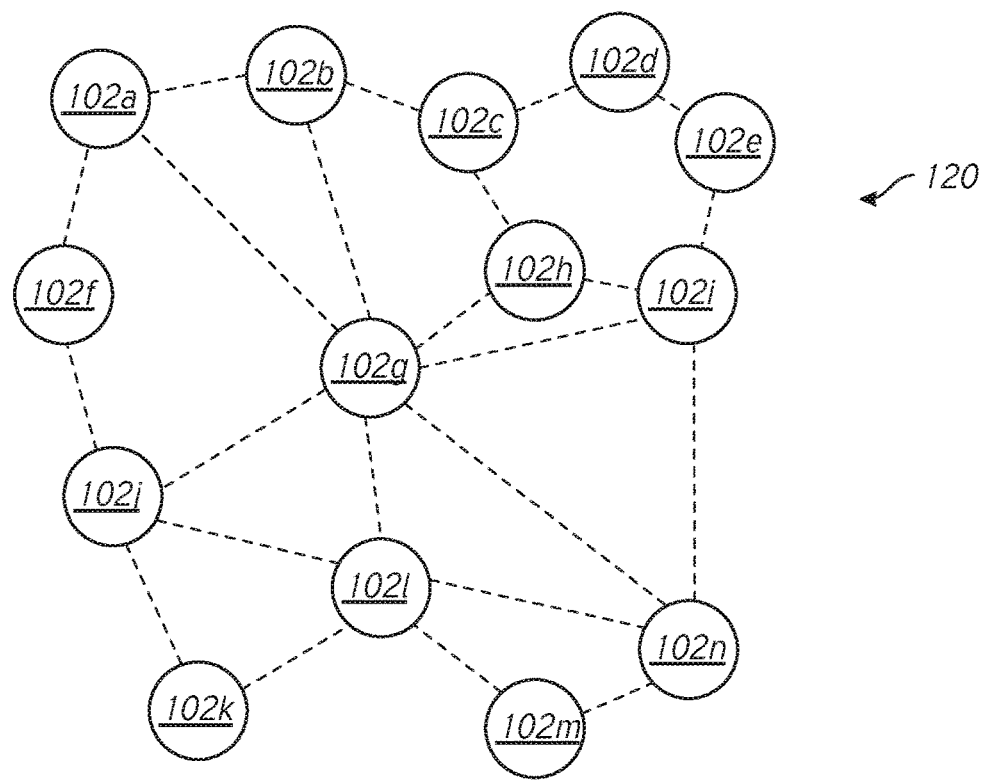
FIG. 1B shows a modeled network representation of the geographical area of FIG. 1A.

FIG. 1B shows a modeled network representation of the geographical area 110 of FIG. 1A. The network representation models each of the geographical regions 101a-101n as a node 102a-102b within a network 120. Further, boundaries between geographical regions 101a-101n are modeled are links between nodes 102a-102n.

Thus, generating a flight path for a drone between a source location within a source geographical region to a destination location within a destination geographical region can be performed using a similar methodology to generating a network data path for a data packet between a source node to a destination node within the network 120. In particular, the flight path can be generated using network traffic engineering methodologies, including packet forwarding methodologies, such as MPLS (Multiprotocol Label Switching) traffic engineering or segment routing traffic engineering.

Modeling the traversal of a drone within a geographical area 110 to traversal of a data packet within a network 120 allows the implementations of a number of network traffic engineering concepts. For example, quality of service (QoS) concepts used in network traffic engineering can be adapted to help in admission control for a drone to certain geographical regions 101a-101n. Networking access control lists can also be used to restrict access to restricted airspace or geographical regions 101a-101n that are temporarily restricted (e.g. due to emergency situations). Advanced network traffic engineering concepts (such as MPLS TE auto bandwidth, auto mesh and the like) can be adapted to address similar air traffic engineering problems with drone navigation. Other network traffic engineering concepts, such as congestion control and load balancing, can also be applied to ensure drone congestion is managed within and between geographical regions 101a-101n.

Figure 2:
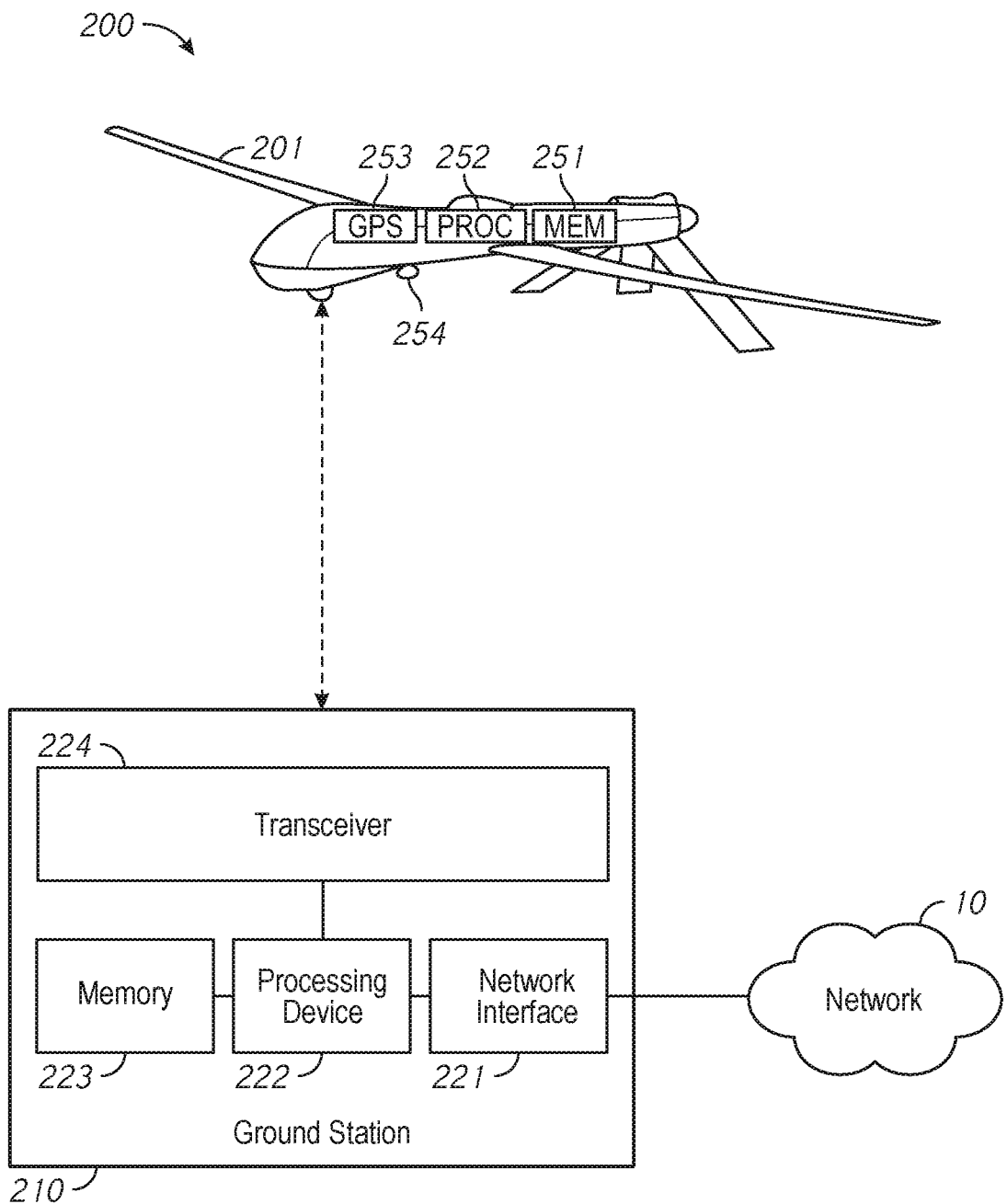
FIG. 2 is functional block diagram of an air traffic control system in accordance with some implementations.

FIG. 2 is functional block diagram of an air traffic control system 200 in accordance with some implementations. The air traffic control system 200 is configured to (at least partially) control the operation of aircraft operating in a geographical area. The aircraft can include a drone 201, other drones (not shown), or manned aircraft. The air traffic control system 200 includes a ground station 210 connected to a network 10. The network 10 includes any public or private LAN (local area network) and/or WAN (wide area network), such as an intranet, an extranet, a virtual private network, a cellular, cable or satellite network, and/or portions of the Internet. Although FIG. 2 shows a single ground station 210, it is to be appreciated that the air traffic control system 200 can include multiple ground stations connected to the network 10, each capable of controlling the operation of multiple aircraft.

The ground station 210, which in some implementations is implemented as a fog computing node, includes a network interface 221 for sending and receiving data over the network 10. The ground station 210 further includes a transceiver 224 for wirelessly communicating with the drone 201. The network interface 221 and the transceiver 224 form a communications interface which may include additional components, such as an input/output interface or a graphical user interface. The ground station 210 further includes a processing device 222 and a memory 223.

The drone 201 includes a position module 253 that determines the position of the drone 201. In some implementations, the position module 253 can include a GPS (global positioning system) unit that determines GPS coordinates of the drone 201. The position module 253 can include other components for determining the position of the drone 201, such as an optical terrain matching component or an altimeter.

The drone 201 includes a transceiver 254 for wireless communicating with the air traffic control system 200. The drone 201 includes a memory 251 and a processing device 252 for, respectively, storing and executing traffic control modules used to report the position of drone 201 and receive flight instructions.

The air traffic control system 200 can be configured to generate a flight path for the drone 201 from a source location (which may be a current location) to a destination location. The air traffic control system 200 can generate the flight path using network traffic engineering methodologies as mentioned above and described in detail below.

Figure 3:
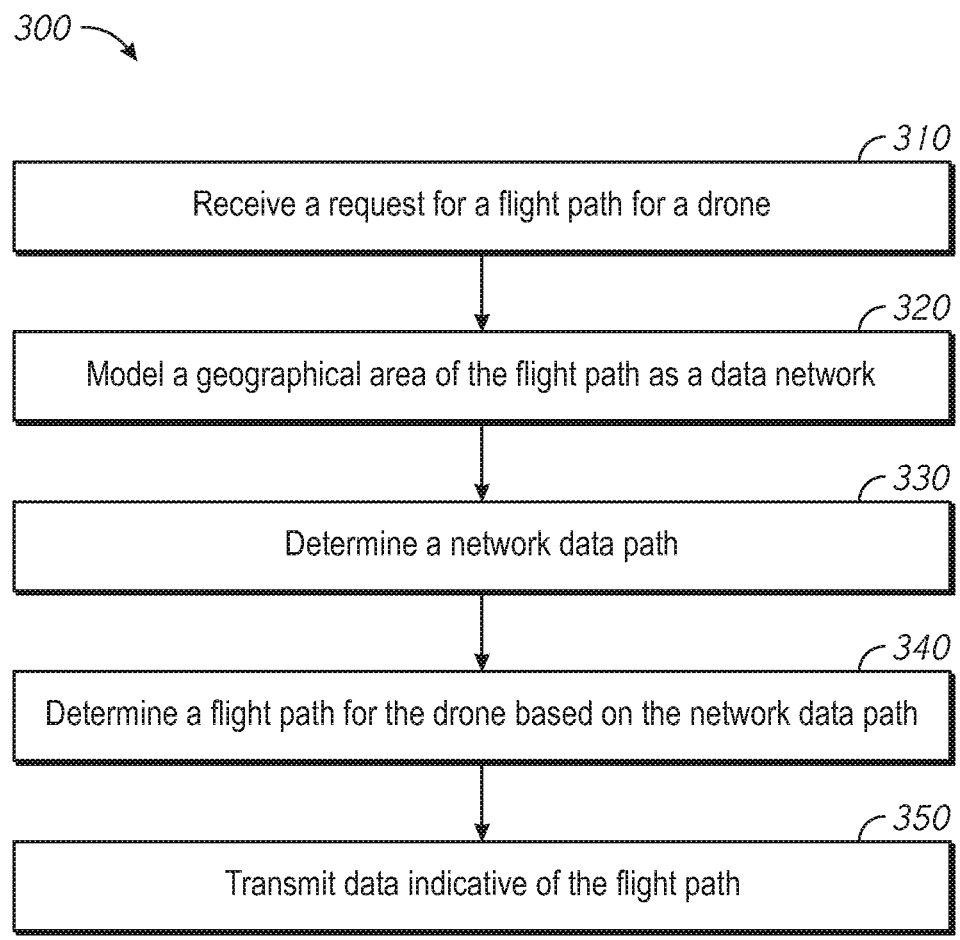
FIG. 3 is a flowchart representation of a method of generating a flight path for a drone in accordance with some implementations.

FIG. 3 is a flowchart representation of a method 300 of generating a flight path for a drone in accordance with some implementations. In some implementations (and as detailed below as an example), the method 300 is performed by an air traffic control system (or a portion thereof), such as the air traffic control system 200 of FIG. 2. In some implementations, the method 300 is performed by processing logic, including hardware, firmware, software, or a combination thereof In some implementations, the method 300 is performed by a processor executing code stored in a non-transitory computer-readable medium (e.g., a memory). Briefly, the method 300 includes receiving a request for a flight path for a drone, determining the flight path using a network traffic engineering model, and transmitting the flight path for the drone.

The method 300 begins, at block 310, with the air traffic control system receiving a request for a flight path for a drone. In various implementations, the request is received from a drone at a current location via a transceiver of a communications interface or from an operator of a drone via a network interface of a communications interface.

The request includes information indicative of a source location within a geographical area and a destination location within the geographical area. In some implementations, the source location and/or destination location are indicated by coordinates. In some implementations, the source location and/or destination location are indicated by identifying a landmark at the location, such as the identifier of a landing perch, a landing roost, or airport.

In various implementations, the request also includes an identifier of the drone. Such an identifier can also be included in other communications to and from the drone, including those described further below, such as data indicative of a flight plan, a request to traverse a boundary, and a response to such a request.

The geographical area includes a plurality of geographical regions (as shown by example in FIG. 1A). At block 320, the air traffic control system models the geographical area as a data network including a plurality of nodes (as shown by example in FIG. 1B). In some implementations, the air traffic control system partitions the geographical area into a plurality of geographical regions based on a desired capacity/density of drones within the geographical region. In various implementations, the geographical regions are polygons, such as triangles, squares, hexagons, octagons, etc., depending on the traffic engineering parameters desired. The geographical regions can be of various sizes. In some implementations, the size of the geographical regions ranges from a few square meters to hundreds of square meters to a few square kilometers. In some implementations, the geographical regions can be larger or smaller.

The air traffic control system can model the geographical area as a data network by mapping the plurality of geographical regions to the plurality of nodes and mapping boundaries between the plurality of geographical regions to links between the plurality of nodes. In some implementations, a boundary (e.g., a particularly long boundary) can be modeled as multiple links between the same source node and destination node.

At block 330, the air traffic control system determines a network data path from a source node of the plurality of nodes corresponding to the source location to a destination node of the plurality of nodes corresponding to the destination location. The air traffic control system can determine the network data path using any of a number of network traffic engineering protocols, such as MPLS traffic engineering or segment routing traffic engineering.

The air traffic control system can map a capacity of the plurality of geographical regions to a capacity of the plurality of nodes and determine the network data path based on the capacity of the plurality of nodes. In various implementations, the capacity of each of the plurality of geographical regions is proportional to the size (or area) of the geographic region. The capacity of a geographical region can be based on other factors, such as weather conditions within the region that would make collisions more or less likely or tracking capabilities of ground stations monitoring the geographical region.

The air traffic control system can map a bandwidth of boundaries between the geographical regions to a bandwidth of links between the plurality of nodes and determine the network data path based on the bandwidth of the links between the plurality of nodes. The bandwidth of a boundary is a measure of the number of drones that can traverse the boundary within a given time period. In various implementations, the bandwidth of each of the boundaries is proportional to the size (or length) of the boundary. The bandwidth of a boundary can be based on other factors, such as weather conditions at the boundary that would make collisions more or less likely or tracking capabilities of ground stations monitoring the boundary.

The air traffic control system can map a priority of the drone to a QoS metric of a data packet and determine the network data path based on the QoS metric. As an example, a military drone may have a higher priority than a delivery drone.

The air traffic control system can map a likelihood of availability of the plurality of regions to a reliability of the plurality of nodes and determine the network data path based on the reliability of the plurality of nodes. In various circumstances, a geographical area can be closed to air traffic. For example, weather conditions can become too severe for air traffic or an emergency situation can cause airspace to become restricted. The likelihood of such an occurrence can be mapped to the likelihood of data network node failing (e.g., the reliability of the data network node) and network traffic engineering protocols designed to compensate for such a situation can be applied to determine the flight path of the drone.

In various implementations, the air traffic control system determines the network data path by minimizing a sum of cost metrics associated with links between the plurality of nodes. Each link between the nodes can be given a cost metric. The cost metric can be one, resulting in a network data path with a minimum number of hops. The cost metric can be a distance between the nodes corresponding to a physical distance between the geographical regions (or, for example, the centers of the geographical regions). The cost metric can be based on a travel time between geographical regions, which can account for flight conditions, such as headwinds or other weather conditions. Similarly, the cost metric can be based on a fuel consumption rating, a measure of the amount of fuel to be used in navigating from one geographical region to another.

The cost metrics can also be used to account for the capacity of the nodes (corresponding to the capacity of the geographical regions), the bandwidth of the links (corresponding to the bandwidth of the boundaries), and the reliability of the nodes (corresponding to the likelihood of availability of the geographical regions) as described above.

The network data path determined by the air traffic control system can indicate a series of nodes to be visited by a data packet or a series of links to be traversed by the data packet.

In some circumstances, the air traffic control system may be unable to determine a network data path between a particular source node and a particular destination node, e.g., due to node failure. In such circumstances, the air traffic control system can respond to the request for a flight path with a failure message or can determine a flight path to nearby location in the hope that nodes are later restored and a flight path can be determined.

At block 340, the air traffic control system determines a flight path for the drone based on the network data path. In various implementations, the air traffic control system maps the series of nodes to a series of geographical regions or maps a series of links to a series of boundaries between geographical regions.

In various implementations, the air traffic control system can determine one or more backup paths between the same source location and destination location using different intermediate regions to provide redundancy or work around unexpectedly congested or temporarily restricted regions. To that end, the air traffic control system can (in block 330) determine backup network data paths from the source node to the destination node and (in block 340) determine backup flight paths based on the backup network data paths.

At block 350, the air traffic control system transmits data indicative of the flight path for the drone. In various implementations, the data is transmitted to a drone at a current location via a transceiver of a communications interface or to an operator of a drone via a network interface of a communications interface.

In some implementations, the data indicative of the flight path includes a series of coordinates corresponding to boundaries between geographical regions corresponding to nodes in the network data path. In some implementations, the data indicative of the flight path includes indicators of the geographical regions to be traversed along the flight path. Thus, in some implementations, the flight path includes a series of waypoints rather than a complete line (or curve) and the drone autonomously navigates between the waypoints rather than adhering to a completely defined path.

Figure 4:
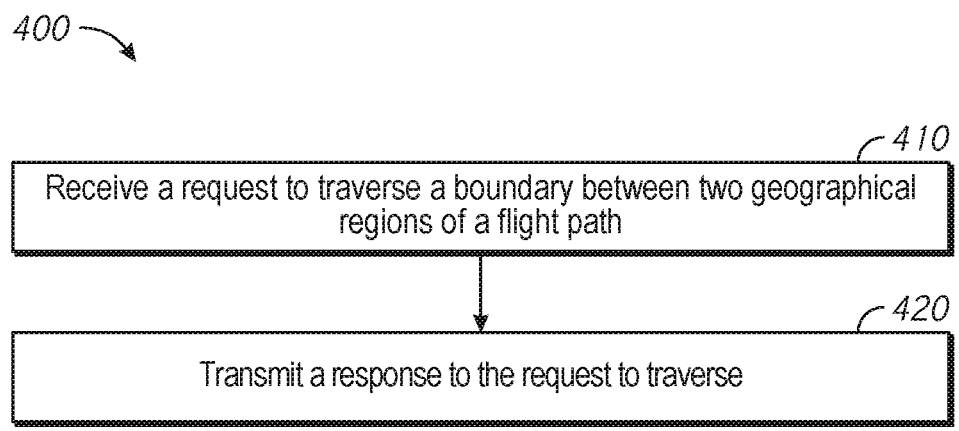
FIG. 4 is a flowchart representation of a method of navigating a drone along a flight path in accordance with some implementations.

FIG. 4 is a flowchart representation of a method 400 of navigating a drone along a flight path in accordance with some implementations. In some implementations (and as detailed below as an example), the method 400 is performed by an air traffic control system (or a portion thereof), such as the air traffic control system 200 of FIG. 2. In some implementations, the method 400 is performed by processing logic, including hardware, firmware, software, or a combination thereof In some implementations, the method 400 is performed by a processor executing code stored in a non-transitory computer-readable medium (e.g., a memory). Briefly, the method 400 includes receiving a request to traverse a boundary and transmitting a response to the request. The method 400 of FIG. 4 can be performed after the method 300 of FIG. 3.

As noted above with respect to FIG. 3, a flight path can include an indication of a series of boundaries between geographic regions to be traversed or a series of geographical regions to be occupied. When a drone approaches a boundary between two geographical regions of the flight path, the drone transmits a request to traverse the boundary. Thus, the method 400 performed by the air traffic control system begins, at block 410, with the reception of a request to traverse a boundary between two geographical regions of a flight path.

The air traffic control system determines whether the boundary is clear for the drone to safety traverse the boundary and, in block 420, transmits a response to the request to traverse the boundary. If the boundary can support traversal, the response indicates permission to traverse the boundary. If the boundary is temporarily unable to support traversal (e.g., other drones are traversing the boundary), the response indicates a command to wait. If the geographical region to which the drone has requested entry is unavailable, the air traffic control system can determine an updated flight path (e.g., using the method 300 of FIG. 3) and the response can indicate the updated flight path.

When the response indicates permission for the drone to traverse the boundary, the response can include an altitude level at which to traverse the boundary. Whereas network traffic can be viewed as a two-dimensional problem, air traffic is a three-dimensional one. However, this difference can be factored into the modeling with common network traffic engineering methodologies, such as link aggregation. In some jurisdictions, fixed altitude increments are defined as the recommended or allowed altitudes at which an aircraft can cruise, such as VFR (visual flight rules) cruising altitude rules in the United States. Thus, the third dimension (altitude) can be modeled as a set of altitude levels (or predefined flight altitudes). At boundaries between geographical regions, there is a set of altitude levels that can be modeled as a set of physical interfaces connecting the same source node and same destination node and can be combined using link aggregation as a single logical interface. Routing decisions can be made at the logical interface level, and then depending on policy and traffic, the drones will be distributed among the various altitude levels and the assigned altitude levels signaled to the drone when it is admitted over the boundary.

The method 400 of FIG. 4 can be repeated at various boundaries until the drone has reached its destination.

Figure 5:
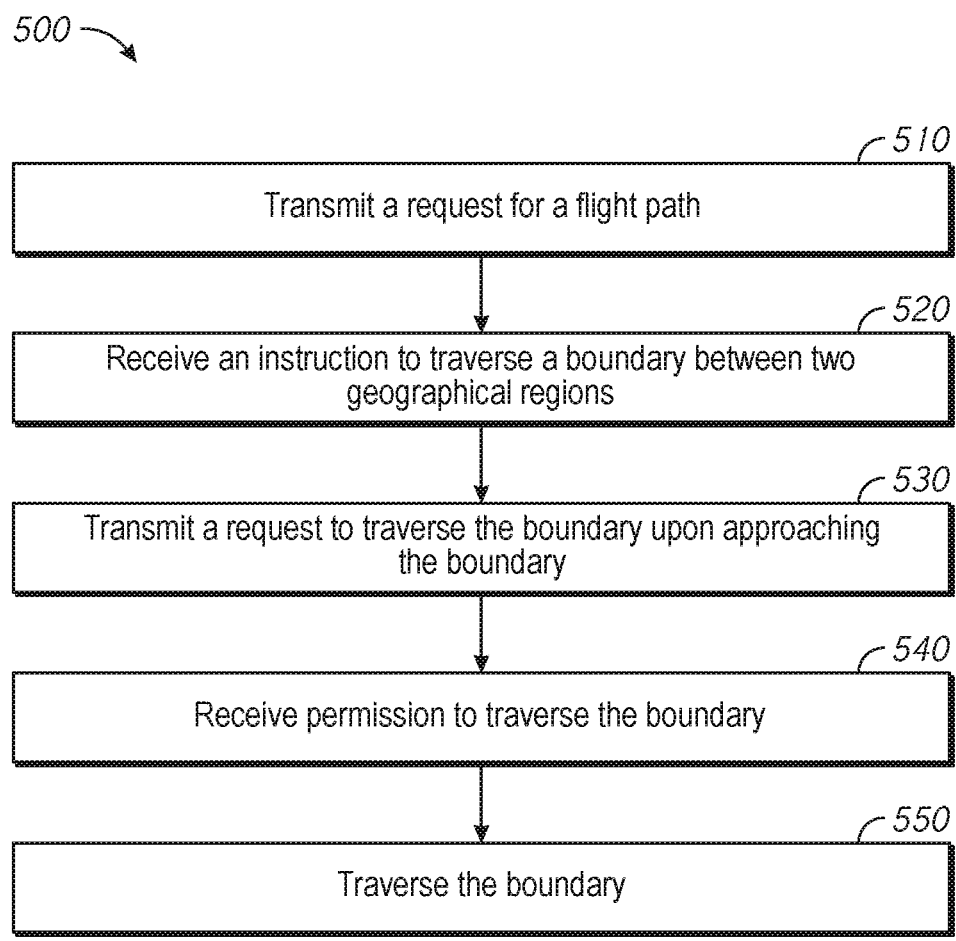
FIG. 5 is a flowchart representation of a method of navigating a drone from a source location to a destination location in accordance with some implementations.

Whereas FIGS. 3 and 4 describe methods that can be performed by an air traffic control system, FIG. 5 describes a method that can be performed by a drone. FIG. 5 is a flowchart representation of a method 500 of navigating a drone from a source location to a destination location in accordance with some implementations. In some implementations (and as detailed below as an example), the method 500 is performed by a drone (or a portion thereof), such as the drone 201 of FIG. 2. In some implementations, the method 400 is performed by processing logic, including hardware, firmware, software, or a combination thereof In some implementations, the method 500 is performed by a processor executing code stored in a non-transitory computer-readable medium (e.g., a memory). Briefly, the method 500 includes requesting a flight path, receiving a flight path including instructions to traverse a boundary, requesting and receiving permission to traverse the boundary, and traversing the boundary.

The method 500 begins, at block 510, with the drone transmitting a request for a flight path. The request includes information indicative of a source location within a geographical area and a destination location within the geographical area. In some implementations, the source location and/or destination location are indicated by coordinates. In some implementations, the source location and/or destination location are indicated by identifying a landmark at the location, such as the identifier of a landing perch, a landing roost, or airport.

At block 520, the drone receives an instruction to traverse a boundary between a first geographical region of the geographical area and a second geographical region of the geographical area. In some implementations, the instruction is part of flight path from the source region to the destination region (similar to a MPLS tunnel in the model) received in response to the transmitting the request for a flight path. In some implementations, the instruction is part of an updated flight path received while en route to the destination location. In some implementations, the instruction is part of a dynamic routing and the drone receives a new instruction at each geographical region it occupies on a hop-by-hop basis. The instruction may be indicated by an edge coordinate of the boundary, an identifier of the boundary, an identifier of the second geographical region, or sequential indications of the first geographical region and the second geographical region.

At block 530, the drone transmits a request to traverse the boundary upon approaching the boundary. In response to the request to traverse the boundary, the drone receives a response. In some implementations, the response includes a command to wait and the method 500 includes transmitting a new request to traverse the boundary at a later time (which may be indicated in the command to wait). In some implementations, the response includes an updated flight path and, thus, the method 500 returns to block 520 where the drone receives an instruction to traverse a boundary (in this case, a different boundary). In some implementations, the response includes permission to traverse the boundary and, thus, the method 500 continues to block 540 at which the drone receives permission to traverse the boundary.

At block 550, the drone traverses the boundary. In some implementations, the permission to traverse the boundary includes an altitude level as described above. Thus, in some implementations, the drone traverses the boundary at an altitude level included with the permission to traverse the boundary. In some implementations, the permission to traverse the boundary includes a time window during which the permission is valid. In some implementations, such a time window is implicit in receiving the permission to traverse the boundary. Thus, in some implementations, the drone traverses the boundary within a predefined time window of receiving the permission to traverse the boundary. The time window can be, for example, one minute or five minutes.

In some implementations, traversing the boundary includes signaling the air traffic control system that the boundary has been traversed. In some implementations, the air traffic control system can deduce that the boundary has been traversed when the drone request permission to traverse another boundary. In some implementations, the air traffic control system can deduce that the boundary has been traversed after a timeout based on a worse case flying time.

In some implementations, a flight plan (e.g., received in block 520) includes instructions for traversing a series of boundaries and the method 500 can return to block 530. In some implementations, the method 500 returns to block 520 and the drone receives further instruction once the boundary is traversed as to which boundary to traverse next. In either case, the drone can be self-guided or controlled by a human to fly from the traversed boundary to the next boundary to be traversed.

Figure 6:
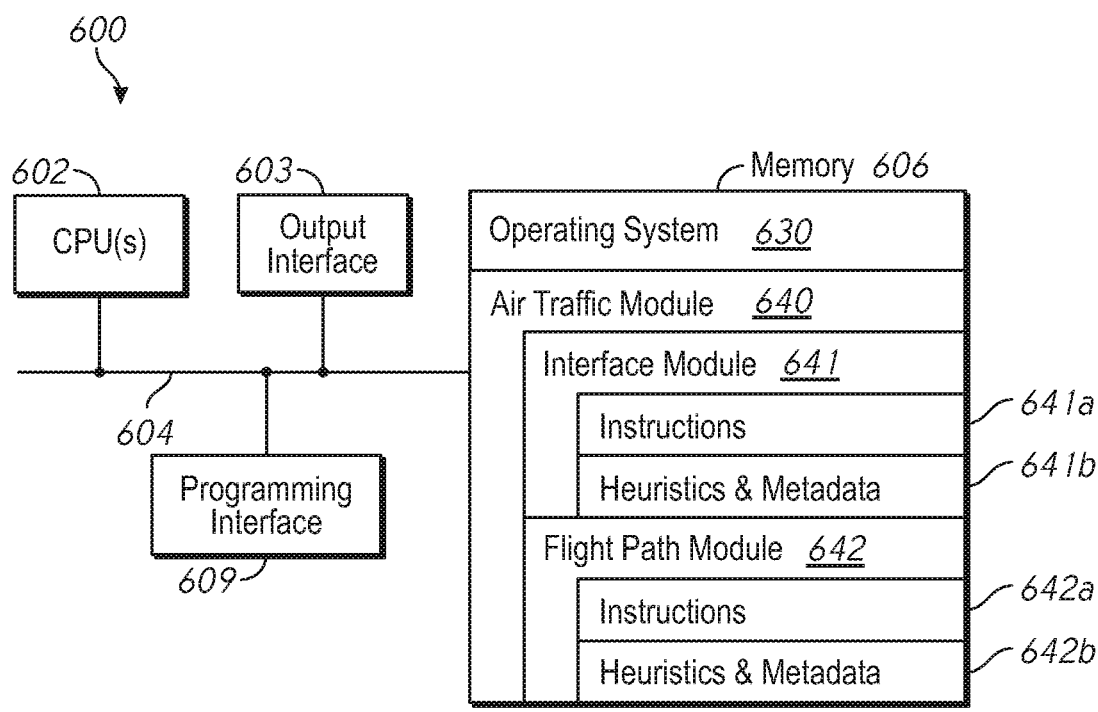
FIG. 6 is a block diagram of a computing device in accordance with some implementations.

FIG. 6 is a block diagram of a computing device 600 in accordance with some implementations. In some implementations, the computing device 600 corresponds to the ground station 210 of FIG. 2 and performs one or more of the functionalities described above with respect to the ground station 210. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 600 includes one or more processing units (CPU's) 602 (e.g., processors), one or more input/output interfaces 603 (e.g., a network interface and/or a sensor interface), a memory 606, a programming interface 609, and one or more communication buses 604 for interconnecting these and various other components.

In some implementations, the communication buses 604 include circuitry that interconnects and controls communications between system components. The memory 606 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 606 optionally includes one or more storage devices remotely located from the CPU(s) 602. The memory 606 comprises a non-transitory computer readable storage medium. Moreover, in some implementations, the memory 606 or the non-transitory computer readable storage medium of the memory 606 stores the following programs, modules and data structures, or a subset thereof including an optional operating system 630 and an air traffic control module 640. In some implementations, one or more instructions are included in a combination of logic and non-transitory memory. The operating system 630 includes procedures for handling various basic system services and for performing hardware dependent tasks. In some implementations, the air traffic control module 640 is configured to generate and provide a flight path for a drone. To that end, the air traffic control module 640 includes an interface module 641 and a flight path module 642.

In some implementations, the interface module 641 is configured to receive a request for a flight path for a drone. The request can include information indicative of a source location within a geographical area and a destination location within the geographical area. To that end, the network interface module 641 includes a set of instructions 641a and heuristics and metadata 641b. In some implementations, the flight path module 642 is configured to model the geographical area including the plurality of geographical regions as a data network including a plurality of nodes. In some implementations, the flight path module 642 is configured to determine a network data path from a source node of the plurality of nodes corresponding to the source location to a destination node of the plurality of nodes corresponding to the destination location and to determine a flight path for the drone based on the network data path. To that end, the sensor interface module 642 includes a set of instructions 642a and heuristics and metadata 642b. In some implementations, the interface module 641 is configured to transmit data indicative of the flight path for the drone.

Although the air traffic control module 640, the interface module 641, and the flight path module 642 are illustrated as residing on a single computing device 600, it should be understood that in other embodiments, any combination of the air traffic control module 640, the interface module 641, and the flight path module 642 reside in separate computing devices in various implementations. For example, in some implementations each of the air traffic control module 640, the interface module 641, and the flight path module 642 reside on a separate computing device or in the cloud.

Figure 7:
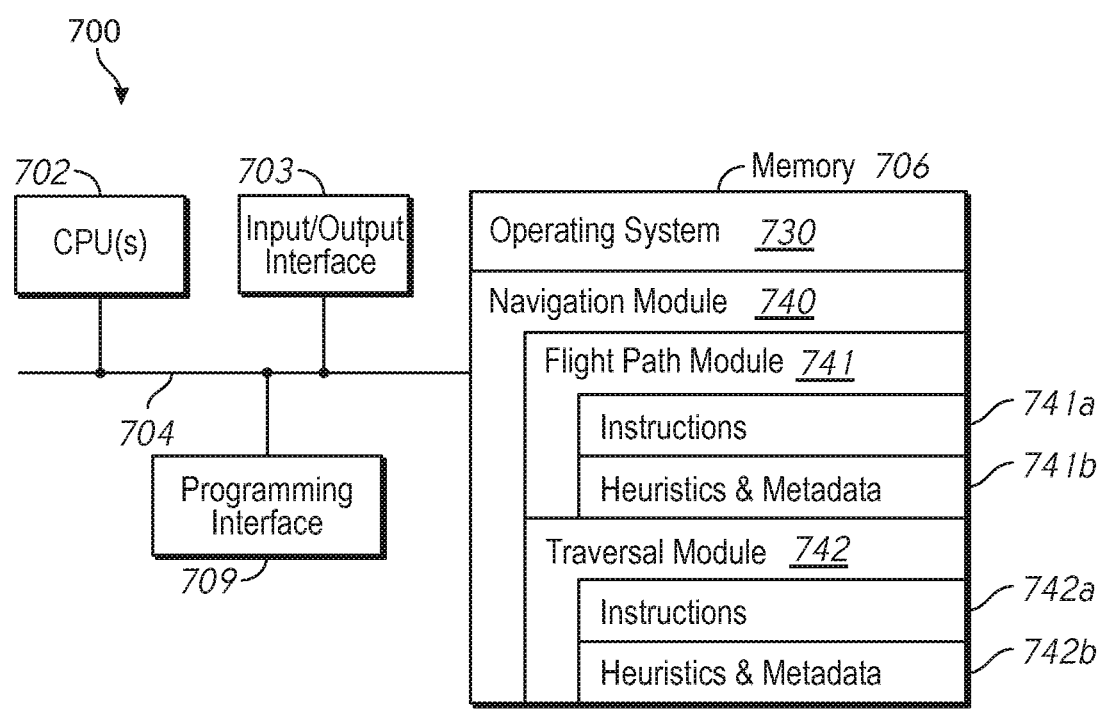
FIG. 7 is block diagram of another computing device in accordance with some implementations.

FIG. 7 is block diagram of another computing device 700 in accordance with some implementations. In some implementations, the computing device 700 corresponds to the drone 201 of FIG. 2 (or the computing system thereof) and performs one or more of the functionalities described above with respect to the drone 201. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 700 includes one or more processing units (CPU's) 702 (e.g., processors), one or more input/output interfaces 703 (e.g., a network interface), a memory 706, a programming interface 709, and one or more communication buses 704 for interconnecting these and various other components.

In some implementations, the communication buses 704 include circuitry that interconnects and controls communications between system components. The memory 706 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 706 optionally includes one or more storage devices remotely located from the CPU(s) 702. The memory 706 comprises a non-transitory computer readable storage medium. Moreover, in some implementations, the memory 706 or the non-transitory computer readable storage medium of the memory 706 stores the following programs, modules and data structures, or a subset thereof including an optional operating system 730 and a navigation module 740. In some implementations, one or more instructions are included in a combination of logic and non-transitory memory. The operating system 730 includes procedures for handling various basic system services and for performing hardware dependent tasks. In some implementations, the navigation module 740 is configured to navigate a drone. To that end, the navigation module 740 includes a flight path module 741 and a traversal module 742.

In some implementations, the flight path module 741 is configured to receive an instruction to traverse a boundary between a first geographical region and a second geographical region. To that end, the flight path module 741 includes a set of instructions 741*a* and heuristics and metadata 741*b*. In some implementations, the traversal module 742 is configured to transmit a request to traverse the boundary upon approaching the boundary. In some implementations, the traversal module 742 is configured to receive permission to traverse the boundary. To that end, the traversal module 742 includes a set of instructions 742*a* and heuristics and metadata 742*b*.

Although the navigation module 740, the flight path module 741, and the traversal module 742 are illustrated as residing on a single computing device 700, it should be understood that in other embodiments, any combination of the navigation module 740, the flight path module 741, and the traversal module 742 reside in separate computing devices in various implementations. For example, in some implementations each of the navigation module 740, the flight path module 741, and the traversal module 742 reside on a separate computing device.

Moreover, FIGS. 6 and 7 are intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIGS. 6 and 7 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:

at an air traffic control system including a non-transitory memory and one or more processors:

receiving a request for a flight path for a drone, the request including information indicative of a source location within a geographical area and a destination location within the geographical area;

modeling the geographical area as a data network of nodes and links, wherein modeling includes representing a plurality of geographical regions as the data network including a plurality of nodes, wherein modeling the geographical area as the data network includes mapping the plurality of geographical regions to the plurality of nodes and mapping boundaries between the plurality of geographical regions to links between the plurality of nodes;

determining a network data path from a source node of the plurality of nodes corresponding to the source location to a destination node of the plurality of nodes corresponding to the destination location, based on a minimization of cost metrics associated with the links between the plurality of nodes in the modeled geographical regions, the cost metrics including at least a hop count of nodes;

converting the network data path in the modeled geographical area into a flight path for the drone, wherein data network traffic engineering processes are used to determine the flight path for the drone; and instructing the drone to traverse the geographic area in accordance with the flight path for the drone.

2. The method of claim 1, wherein the request for the flight path for the drone is received from the drone and the flight path for the drone is transmitted to the drone.

3. The method of claim 1, wherein a bandwidth of a link between two nodes in the data network is a function of a measurement of a boundary between two geographical regions that correspond to the two nodes.

4. The method of claim 1, wherein determining the network data path is based on capacity of the plurality of nodes corresponding to capacity of the plurality of geographical regions.

5. The method of claim 1, wherein determining the network data path is based on bandwidth of links between the plurality of nodes corresponding to bandwidth of boundaries between the plurality of geographical regions.

6. The method of claim 1, wherein determining the network data path is based on a QoS metric corresponding to a priority of the drone.

7. The method of claim 1, wherein determining the network data path is based on reliability of the plurality of nodes corresponding to likelihood of availability of the plurality of geographical regions.

8. The method of claim 1, wherein determining the network data path further comprises minimizing a sum of the cost metrics associated with links between the plurality of nodes.

9. The method of claim 8, wherein the cost metrics associated with links between the plurality of nodes are further based on at least one of a physical distance, a travel time, or a fuel consumption rating.

10. The method of claim 1, wherein instructing the drone to traverse the geographical area in accordance with the flight path includes transmitting data indicative of the flight path including a series of coordinates corresponding to boundaries between geographical regions corresponding to nodes in the network data path.

11. The method of claim 1, wherein instructing the drone to traverse the geographical area in accordance with the flight path includes transmitting data indicative of the flight path includes indicators of the geographical regions to be traversed along the flight path.

12. The method of claim 1, further comprising: receiving a request to traverse a boundary between two geographical regions of the flight path; transmitting a response to the request to traverse the boundary, the response indicating at least one of a permission to traverse, a command to wait, or an updated flight path.

13. The method of claim 12, wherein the permission to traverse includes an altitude level at which to traverse the boundary.

14. A system comprising:
a communications interface;
one or more processors; and
a non-transitory memory comprising instructions that when executed cause the one or more processors to perform operations comprising:
receiving, via the communications interface, a request for a flight path for a drone, the request including information indicative of a source location within a geographical area and a destination location within the geographical area;
modeling the geographical area as a data network of nodes and links, wherein modeling includes representing a plurality of geographical regions as the data network including a plurality of nodes, wherein modeling the geographical area as the data network includes mapping the plurality of geographical regions to the plurality of nodes and mapping boundaries between the plurality of geographical regions to links between the plurality of nodes;
determining a network data path from a source node of the plurality of nodes corresponding to the source location to a destination node of the plurality of nodes corresponding to the destination location, based on a minimization of cost metrics associated with the links between the plurality of nodes in the modeled geographical regions, the cost metrics including at least a hop count of nodes;
converting the network data path in the modeled geographical area into a flight path for the drone, wherein data network traffic engineering processes are used to determine the flight path for the drone; and
instructing, via the communications interface, the drone to traverse the geographic area in accordance with the flight path for the drone.

15. The system of claim 14, wherein determining the network data path includes minimizing a sum of the cost metrics associated with links between the plurality of nodes.

16. The system of claim 14, the operations further comprising:
receiving, via the communications interface, a request to traverse a boundary between two geographical regions of the flight path; and
transmitting, via the communications interface, a response to the request to traverse, the response indicating at least one of permission to traverse, command to wait, or an updated flight path.

17. A non-transitory memory storing one or more programs, the one or more programs comprising instructions, which, when executed by one or more processors of a device, cause the device to:
receive a request for a flight path for a drone, the request including information indicative of a source location within a geographical area and a destination location within the geographical area;
model the geographical area as a data network of nodes and links, wherein modeling includes representing a plurality of geographical regions as the data network including a plurality of nodes, wherein modeling the geographical area as the data network includes mapping the plurality of geographical regions to the plurality of nodes and mapping boundaries between the plurality of geographical regions to links between the plurality of nodes;
determine a network data path from a source node of the plurality of nodes corresponding to the source location to a destination node of the plurality of nodes corresponding to the destination location, based on a minimization of cost metrics associated with the links between the plurality of nodes in the modeled geographical regions, the cost metrics including at least a hop count of nodes;
convert the network data path in the modeled geographical area into a flight path for the drone, wherein data network traffic engineering processes are used to determine the flight path for the drone; and
instructing the drone to traverse the geographic area in accordance with the flight path for the drone.

18. The non-transitory memory of claim 17, wherein a request for the flight path for the drone is received from the drone and the flight path for the drone is transmitted to the drone.

19. The non-transitory memory of claim 17 wherein a bandwidth of a link between two nodes in the data network is a function of a measurement of a boundary between two geographical regions that correspond to the two nodes.

20. The non-transitory memory of claim 17, wherein determining the network data path is based on the capacity of the plurality of nodes corresponding to capacity of the plurality of geographical regions.

* * * * *

UNITED STATES PATENT AND TRADEMARK OFFICE
CERTIFICATE OF CORRECTION

PATENT NO. : 10,395,542 B2
APPLICATION NO. : 15/083271
DATED : August 27, 2019
INVENTOR(S) : Medhat Ramzi Yakan It is certified that error appears in the above-identified patent and that said Letters Patent is hereby corrected as shown below:

In the Specification

Column 4, Line 44, please amend as shown:
thereof. In some implementations, the method 300 is per- Column 7, Line 15, please amend as shown:
combination thereof. In some implementations, the method Column 8, Line 11, please amend as shown:
hardware, firmware, software, or a combination thereof. In Signed and Sealed this
Third Day of March, 2020

Andrei Iancu
*Director of the United States Patent and Trademark Office*